(12) United States Patent
Tibbits

(10) Patent No.: US 9,004,799 B1
(45) Date of Patent: Apr. 14, 2015

(54) TRANSFORMABLE LINKED SELF-ASSEMBLY SYSTEM

(76) Inventor: Skylar Tibbits, Boston, MA (US)

( * ) Notice: Subject to any disclaimer, the term of this patent is extended or adjusted under 35 U.S.C. 154(b) by 242 days.

(21) Appl. No.: 13/596,012

(22) Filed: Aug. 27, 2012

Related U.S. Application Data

(60) Provisional application No. 61/529,891, filed on Aug. 31, 2011.

(51) Int. Cl.
*F16D 1/12* (2006.01)
*F16C 11/10* (2006.01)

(52) U.S. Cl.
CPC .................... *F16C 11/10* (2013.01)

(58) Field of Classification Search
USPC ........ 403/53, 54, 56, 78, 83, 84, 86, 112–114
See application file for complete search history.

(56) References Cited

U.S. PATENT DOCUMENTS

| | | | |
|---|---|---|---|
| 2,533,494 A * | 12/1950 | Mitchell, Jr. .................. | 248/160 |
| 4,942,700 A | 7/1990 | Hoberman | |
| 5,215,338 A * | 6/1993 | Kimura et al. ............. | 285/154.2 |
| 5,348,259 A | 9/1994 | Blanco et al. | |
| 5,531,625 A * | 7/1996 | Zhong ........................... | 446/120 |
| 6,352,227 B1 * | 3/2002 | Hathaway ..................... | 248/160 |
| 6,379,073 B1 | 4/2002 | Yoo et al. | |
| 6,494,635 B1 | 12/2002 | Merlo | |
| 6,688,797 B2 * | 2/2004 | Park et al. ........................ | 403/93 |
| 6,767,153 B1 * | 7/2004 | Holbrook ........................ | 403/56 |
| 8,197,149 B2 | 6/2012 | Darrow | |
| 8,297,566 B2 | 10/2012 | Bevirt | |
| 8,425,526 B2 | 4/2013 | Waltersdorff et al. | |
| 8,608,398 B2 | 12/2013 | Mekid | |
| 2002/0043950 A1 | 4/2002 | Yim et al. | |
| 2002/0131813 A1 * | 9/2002 | Chen ................................ | 403/83 |
| 2003/0012595 A1 * | 1/2003 | Park et al. ........................ | 403/84 |
| 2003/0016989 A1 * | 1/2003 | Wentworth et al. ............. | 403/56 |
| 2005/0227213 A1 | 10/2005 | Roth et al. | |
| 2007/0212163 A1 * | 9/2007 | Bevirt ............................. | 403/56 |
| 2010/0034579 A1 * | 2/2010 | He et al. ......................... | 403/115 |
| 2010/0236020 A1 | 9/2010 | Tsai et al. | |
| 2010/0330867 A1 | 12/2010 | Fogel et al. | |
| 2012/0124754 A1 * | 5/2012 | Frazer ................................. | 7/118 |
| 2014/0097320 A1 | 4/2014 | Rizk et al. | |

FOREIGN PATENT DOCUMENTS

| EP | 0 045 526 A1 | 10/1982 |
|---|---|---|
| EP | 1 005 884 A2 | 7/2000 |

\* cited by examiner

*Primary Examiner* — Michael P Ferguson
*Assistant Examiner* — Jonathan Masinick

(57) ABSTRACT

The Self-Assembly System is composed of a series of units that take an external force that activates an individual state in each unit and sequentially folds/rotates/expands to form a rigid 3-dimensional structure. The system self-assembles from a flexible linear chain or 2-dimensional grid pattern into a rigid 3-dimensional structure, simply by adding an external energy source. The mechanism and placement of each unit provides the sequence of fold angles that is activated by external energy. When the system is assembled, unit-by-unit, or pre-manufactured as a single linked strand, the user is actually "programming" the folding sequence, much like our body's protein strands, that take external energy and fold in a 3-dimensional structure. This demonstrates that structures can be built from 1-dimensional or 2-dimensional flexible geometry and self-assemble into 3-dimensional rigid geometry without manual assembly or construction, simply through an external means of energy.

9 Claims, 16 Drawing Sheets

TRANSFORMABLE LINKED SELF-ASSEMBLY SYSTEM

RELATED APPLICATION

The present application claims the benefit of, and priority from, U.S. provisional application Ser. No. 61/529,891, filed Aug. 31, 2011, and that application is hereby incorporated herein by reference.

TECHNICAL FIELD

The present invention relates generally to self-assembly systems and, more particularly, to self-assembly systems that are linked or linkable and that interlock at a set of preselected angles.

BACKGROUND ART

The various self-assembly or reconfigurable chains are disclosed in the following documents; [Arthur Olson US 20100168439 AI, Self-Assembled Polyhedra], [Douglas A. Engel U.S. Pat. No. 4,735,418, Puzzle Amusement Device], [Richard E. Schaedel U.S. Pat. No. 6,264,199 B1, Folding Puzzle/Transformational Toy with 24 Linked Tetrahedral Elements], [David H. Gracias U.S. Pat. No. 7,007,370 B2, Self-Assembled Electrical Networks], [Mark H. Yim US 2002/0043950 A1, High Mechanical Advantage Ratcheting Apparatus], [Bradford Tyler Sorensen US 2008/0066393 A1, Instant, Pre-Tensioned, Tool-Free, Polyhedral, Enclosure Construction System].

SUMMARY OF THE EMBODIMENTS

A set of self-assembly units that comprise at least one connector hub with a rotational axis and at least one assembly arm coupled to the hub that defines the assembly arm plane in which there is a longitudinal axis of the assembly arm. The set of self-assembly units may alternatively be manufactured as a single strand with many hubs and assembly arms directly linked together rather than assembled as individual elements. The connector hub and assembly arm are configured one after another so that (i) when the assembly arm of the first unit is linked with the connector hub of the second unit, a resulting linkage allows motion of the assembly arm of the first unit about the axis of the connector hub of the second unit and (ii) when the assembly arm is moved into a selected angle about the connector hub axis of the second unit, the assembly arm will interlock at the selected angle, the selected angle being selected from a set of defined angles. When the set of units are linked into a chain without interlocking and thereafter subjected to a suitable energy input, the set of units will interlock with one another so as to assume a shape determined at least in part by the set of defined angles.

In a related embodiment, the set is manufactured so that the units are intrinsically linked. Alternatively, each unit is separately manufactured and the units are configured to be linked after manufacturing of the units.

In another related embodiment, the set of defined angles includes only a single angle and therefore each unit of the set interlocks with any other unit of the set at the single angle.

Alternatively or in addition, the connector hub and assembly arm are configured so that the assembly arm of the first unit will interlock at the selected angle with the connector hub of the second unit in either a first orientation of the assembly arm of the first unit or a second orientation wherein the assembly arm of the first unit has been rotated about the longitudinal axis 180 degrees compared to the first orientation.

In a further related embodiment, the set includes at least two self-assembly units wherein the connector hub axis is not co-planar with the assembly arm plane, so that when the set of units are linked and interlocked, they define a 3-dimensional shape, such shape defined in part by the set of angles, in self-assembly units of the set, between the connector hub axis and the assembly plane. Optionally, the set includes at least two self-assembly units wherein the connector hub axis is perpendicular to the assembly arm plane, so that when the set of units are linked and interlocked, they define a 3-dimensional shape.

In another related embodiment, the set includes at least two self-assembly units wherein the connector hub axis is co-planar with the assembly arm plane, so that when the set of units are linked into a chain and interlocked, they assume a 2-dimensional shape.

In another related embodiment, the group of all preselected angles includes as many angles as there are units in the set and wherein each unit of the set interlocks with any other unit in the set at an angle that is distinct among the set of units.

Alternatively, the group of all preselected angles includes a smaller number of angles than there are units in the set, so that some angles are repeated when the set of units are interlocked with one another.

In a further related embodiment, each unit comprises a plurality of hubs.

In yet another related embodiment, each unit comprises a plurality of arms.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions

Figure 2:
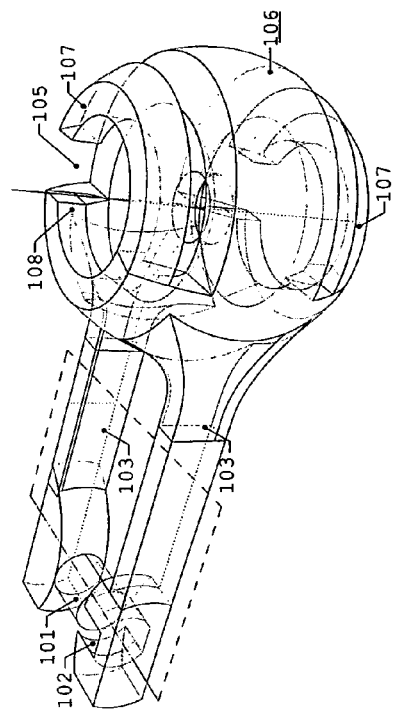
FIG. 2 is perspective view of the single self-assembly unit of FIG. 1.

As used in this description and the accompanying claims, the following terms shall have the meanings indicated, unless the context otherwise requires:

The term "link" means at least two connected units in a flexible state that is ready to accept an external energy source.

The term "interlock" means the manipulation of two linked units, such that one of the units moves into a locked position at a preselected angle. The interlocking mechanism may include physical latching, magnetic attraction, material expansion, cable tensioning etc. The sequential interlocking of linked units can achieve a global configuration determined by the face geometry and preselected angle of the hub The term "chain" means a series (more than two) linked units connected in a linear, 1-dimensional, sequence.

The term "grid" means a series (more than two) linked units connected in a 2-dimensional pattern rather than a linear, 1-dimensional, pattern.

The term "hub" means a main element of a self-assembly unit that has the function of specifying the transformational angle between two units given a suitable energy input. In carrying out this function, the hub may contain components including but not limited to types such as: a connector, an interlocking latch, a stopping wall, a flexure arm, a pin, a pinhole, and an elastic hole. In various embodiments, the hub may contain a plurality of components of a given type, and similarly may exclude components of selected types.

The term "assembly arm" means a main element of a self-assembly unit that is coupled to the hub and defines a linear distance between the hub to which it is coupled and the hub of another unit to which it is linked. The term "interlocking latch" means a locking mechanism associated with the hub of a first self-assembly unit that mechanically traps an arm of a second self-assembly unit in the hub of the first self-assembly unit a specific angle and into a specific position.

The term "stopping wall" means a structure in a hub of a first unit that establishes a limit of movement of a main element of a second unit that is linked to the first unit. A stopping wall may be implemented, for example, so that stopping walls on two linked units come together to specific a chamfer angle for folding. Alternatively, for example, a stopping wall of a first unit may be configured to act as a back-stop when an assembly arm of a second unit rotates into an interlocking position.

The term "flexure arm" means a cantilevered structure in a hub of a first unit for receiving at least a portion of an assembly arm of a second unit in a manner that flexes in response to torque supplied by the assembly arm of the second unit. The flexure arm applies a force on the captured assembly arm that is greater when the arm is moved near the base of the cantilevered structure and smaller as the arm is move away from the base.

The term "pin," means a component in a main element of a first self-assembly unit that fits into a pinhole or recess of the main element and allows a second self-assembly unit to rotate about an axis defined by the component.

The term "recess" means an area in a main element of a self-assembly unit that receives a pin.

The term "pinhole" means an area in a main element of a first self-assembly unit that receives a pin and constrains the pin from moving except along the long axis of the pin. The pinhole enables the rotation of a second self-assembly unit about an axis defined by a pin inserted in the pinhole.

The term "elastic hole" means area passageway in one or more main elements of a self-assembly unit that receives a piece of elastic cord or other type of material to supply a suitable energy source to the self-assembly system.

The term "energy input", applied to a self-assembly system in accordance with an embodiment of the present invention, means unguided energy in the form of kinetic energy, including but not limited to vibration, shaking, heating, and sliding, or in the form of release of potential energy, including but not limited to that imparted by an elastic cord to a set of self-assembly units that are oriented in a manner as to cause stretching of the cord, or resulting from elevation over a surface onto which the system is dropped or thrown; or a mixture of any of the foregoing forms of energy; while many different forms of energy may be employed, it is principally required that the energy provide random forces on the system so that eventually orientations will result between adjacent units of the system wherein they will interlock with one another. When we said that the energy is "unguided" we mean to require that the energy source does not define the shape assumed by the self-assembly system when subjected to the energy; rather the self-assembly system itself defines the shape.

Various embodiments of the present invention provide self-assembly units that can be used in the physical modeling of biological, chemical, computational, robotic, material forms of self-assembly and self-organizational processes, either naturally found or man-made. Embodiments herein may be constructed in size ranges including nano-scale, human-scale, and even astronomical-scale.

Embodiments herein may be used to model protein folding and DNA origami where single sequences of assembly information, simple units with a desired state and an external force, can build any 3-dimensional functioning structure. This particular implementation uses a 3-dimensional printed plastic material with individual units that can be assembled piece-by-piece and shaken to fold into a 3-dimensional shape. This implementation lends itself towards a self-assembly toy that allows the user to simply print, buy or build a 1-dimensional or 2-dimensional shape then add an energy source and build a desired 3-dimensional structure, text, figure or functioning/transforming part. Embodiments herein may be utilized to build large-scale pavilions, tent structures or other quickly deployable architectural structures. Embodiments herein can also serve as an educational device, a novelty device, a functional structural assembly system, a method for constructing large rigid enclosures, for making mechanical and transformable appendages, at extremely small scales to make structures at biological scales or surfaces that are programmable, deformable, adaptable or dynamic, or transformable space infrastructure systems. Embodiments herein do not necessarily require electricity or motors (although such aspects can be incorporated in various embodiments, but rely on mechanical and geometric structures to provide the "state" of each unit. Various embodiments may be implemented in a wide range of scales to provide functional, low cost, low-energy, and precise rigid 3-dimensional structures from simple 1-dimensional or 2-dimensional patterns and an energy input.

Figure 1:
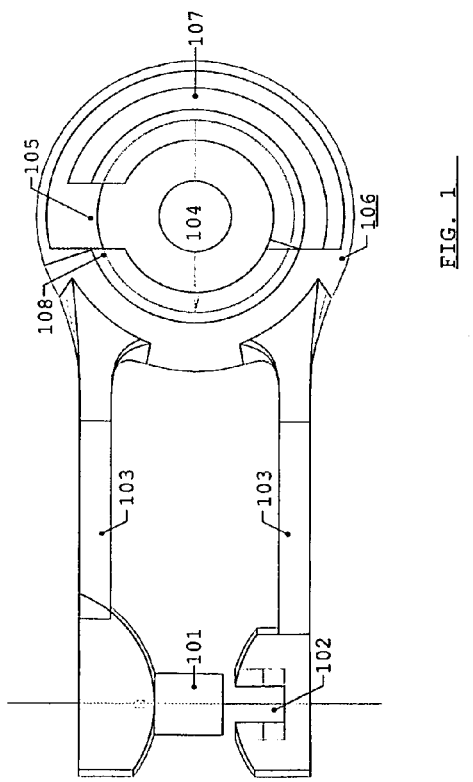
FIG. 1 is a top view of a single self-assembly unit in accordance with an embodiment of the present invention.

FIG. 1 is a top view of a single self-assembly unit in accordance with an embodiment of the present invention. The unit includes a pair of assembly arms 103 and hub 106.

FIG. 2 is perspective view of the single self-assembly unit of FIG. 1. In this view it can be seen that the hub 106 includes an arrangement by which an arm 103 of another unit can be linked and optionally interlocked 105.

Figure 3:
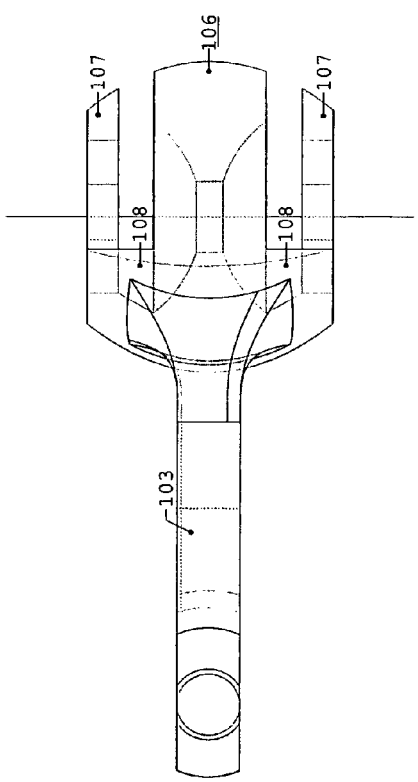
FIG. 3 is a side view of the single self-assembly unit of FIG. 1.

FIG. 3 is a side view of the single self-assembly unit of FIG. 1. In this view it can be seen that there are two flexure arms 107 and two stopping walls 108 on opposite sides of the hub 106. It can also be seen that the flexure arms 107 are cantilevered off of the hub as to provide less friction towards the interlocking latch 105.

Figure 4:
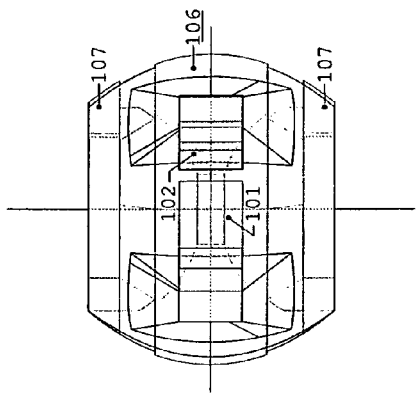
FIG. 4 is a rear view of the single self-assembly unit of FIG. 1.

FIG. 4 is a rear view of the single self-assembly unit of FIG. 1. In this view it can be seen that there is a pin 101 that can be received by the recess 102 that are situated at the end of the arms 103.

We now discuss FIGS. 1-4 in specificity. This embodiment is constructed by adding individual, self-similar, units together to form a chain. Each unit can be made of plastic, rubber, wood, metal or any other solid or semi-rigid material. In this particular embodiment of the self-assembly system, there is only one unit type—each unit is identical to every other unit in the chain. The unit includes a hub 106 and arms 103. The arms 103 include a pin 101 and a recess 102 to receive the pin. This particular pin 101 has a diameter of +/−0.125" (in a specific implementation of the embodiment) and an equivalent diameter on the recess 102. The pin 101 and recess 102 come into contact with one another when they are squeezed together, where the pivoting movement is coming from the connecting arms 103. The arms may be implemented, for example, with an approximate dimension of 0.125"×0.125". The arms are directly connected to the pin/recess 101 & 102 and the hub portion 106 of the unit. The arms provide slight flexibility from their connection to the hub 106 due to the cantilever and material property. This flexibility allows the pin 101 and recess 102 to touch.

The hub portion of the unit includes the flexure arms 107, the interlocking latch 105, the pinhole 104, and the stopping walls 108. The hub 106 provides the firm connection to the arms 103 and the pin/recess 101 & 102. In a specific implementation, the hub has an approximate sphere dimension of 0.6". The hub 106 then links to the two flexure arms 107 that are cantilevered outwards. The flexure arms 107 have an approximate dimension of 0.125"×0.063". The cantilever flexure arms 107 provide more friction when a second unit is linked and rotated towards the hub 106 and less friction when rotated away from the connection, towards the interlocking latch 105. These flexure arms help to guide the rotation of a second unit towards the interlocking latch 105. The interlocking latches 105 have an approximate dimension of 0.133"× 0.158", which is just enough to house each of the arms 103 of a second unit when they have rotated to the end of the flexure arms 107. Once the second unit's arms have reached the end of the flexure arm 107 the unit will pop into the interlocking latch 105 and be locked into position. The stopping walls 108 are adjacent to the interlocking latches 105 and stop a second unit's arms 103 from rotating further. The final feature of the hub portion of the unit is the pinhole 104. The pinhole 104 is a hole that receives the pin 101 of a second unit when it has been linked. This provides the pivot of rotation for the second unit as it swivels underneath the flexure arms 107 and snaps into the interlocking latches 105.

To link two units together in this implementation of the self-assembly system, a user will expand the arms 103 of a single unit far enough to slip the pin 101 and recess 102 over the flexure arms 107 and hub 106 of a second unit. The first unit's pin 101 will fall into place directly into the pinhole 104 of the second unit. The flexure arms 107 of the second unit should be lifted and separated slightly as to allow the arms 103 of the first unit to slide underneath of them. Once the arms 103 of the first unit are beneath the flexure arms 107 of the second unit, both units are in a linked state and ready for energy to transform them into an interlocked state or to be linked to further units. The user can decide how many units to link together and at which end of the chain to build from.

An alternate method for constructing a self-assembly system is to print (using a three-dimensional printer), mold, cast or manufacture an entire chain as a single functioning piece. Such a method would then obviate the need for manually linking of the individual units.

Figure 5:
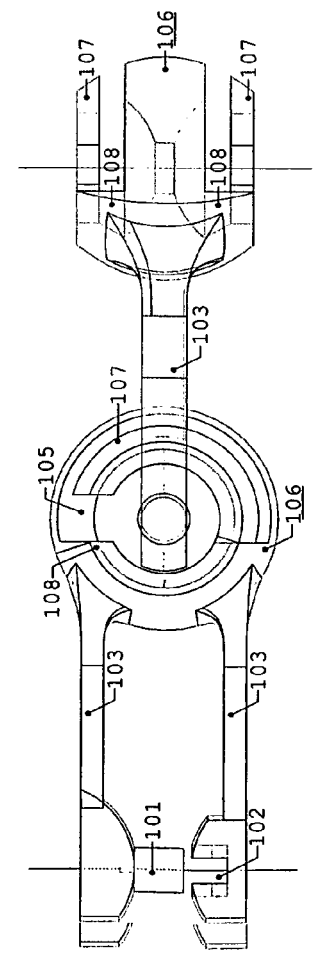
FIG. 5 is a top view of a pair of the units of FIG. 1, shown here linked together, but not interlocked.

FIG. 5 is a top view of a pair of the units of FIG. 1, shown here linked together, but not interlocked. In this view it can be seen that the linked state includes a second unit rotated 90 degrees about the long axis in order to situate the pin 101 into the pinhole 104 of the hub 106 of the first unit. The second unit's arms 103 reside underneath the flexure arms 107 and are providing friction as the second unit rotates. In this view the second unit is free to rotate about the pivot point at the center of the pinhole 104, underneath the flexure arms 107.

Figure 6:
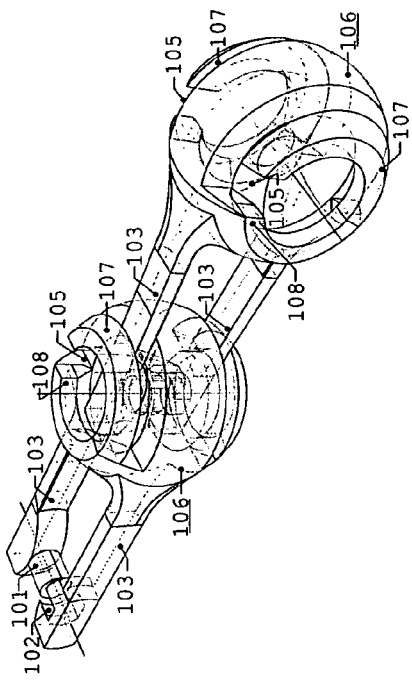
FIG. 6 is a perspective view of a pair of the units as shown in FIG. 5.

FIG. 6 is a perspective view of a pair of the units as shown in FIG. 5.

Figure 7:
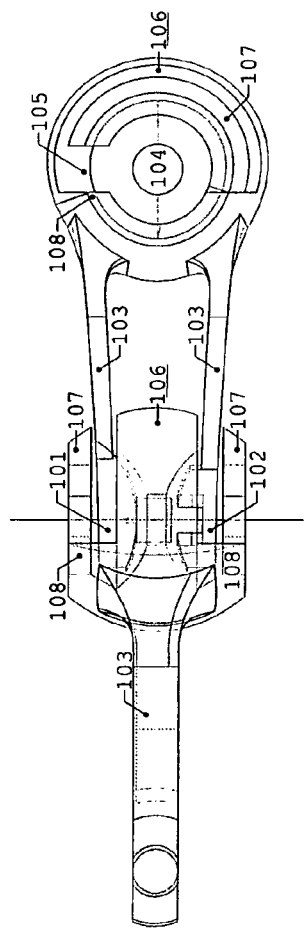
FIG. 7 is a side view of a pair of the units as shown in FIG. 5.

FIG. 7 is a side view of a pair of the units as shown in FIG. 5. In this view it can be seen that the arms 103 of the second unit are compressed slightly to fall below the flexure arms 107 of the first unit, providing friction and resistance as the second unit rotates freely about the pivot point at the center of the pinhole 104.

Figure 8:
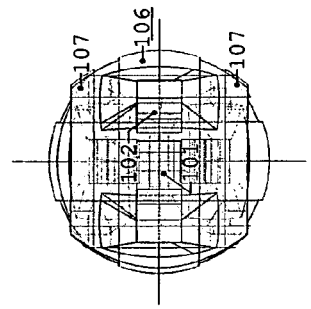
FIG. 8 is a rear view of a pair of the units as shown in FIG. 5.

FIG. 8 is a rear view of a pair of the units as shown in FIG. 5.

We now discuss the embodiment of FIGS. 5-8. When the user links each unit of this embodiment to the end of the chain, the user may choose which orientation to place the unit. As previously described, the flexure arms 107 provide a single direction of less resistance (towards the interlocking latch 105). This means that the user can choose to orient the unit in one of two ways (with the interlocking latch 105 upwards or the interlocking latch 105 downwards (possibly left or right depending on the orientation in 3-dimensions)). When the user links a unit to the end of the chain in a specified orientation, it will explicitly determine the ultimate rotation of that unit (towards the least resistance of the flexure arms 107). The selected orientation of the units and the preselected angle of the interlocking latch will determine, in part, the final 3-dimensional shape of the interlocked chain.

Figure 9:
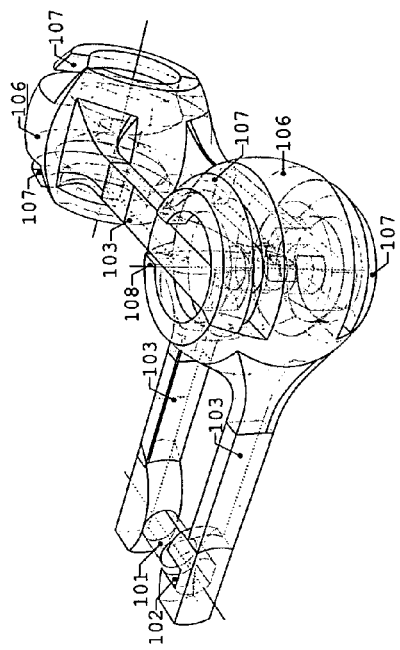
FIG. 9 is a top view of a pair of the units of FIG. 1, shown here linked together, and interlocked at 90 degrees.

FIG. 9 is a top view of a pair of the units of FIG. 1, shown here linked together, and interlocked at 90 degrees.

Figure 10:
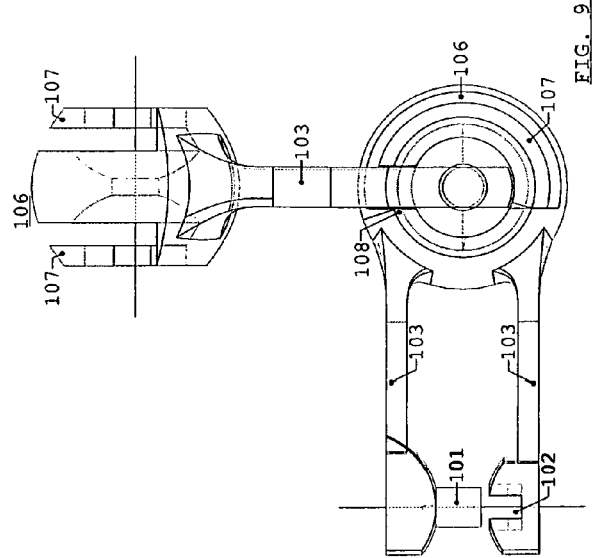
FIG. 10 is a perspective view of a pair of the units as shown in FIG. 9.

FIG. 10 is a perspective view of a pair of the units as shown in FIG. 9. It can be seen in this view that the second unit's arms 103 have expanded outwards after being compressed under the flexure arms 107 of the first unit and finally reaching the interlocking latch 105 of the first unit.

Figure 11:
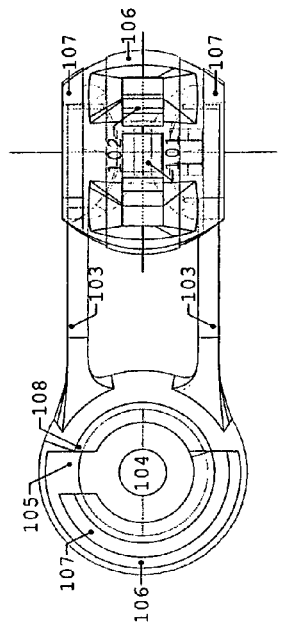
FIG. 11 is a side view of a pair of the units as shown in FIG. 9.

FIG. 11 is a side view of a pair of the units as shown in FIG. 9.

Figure 12:
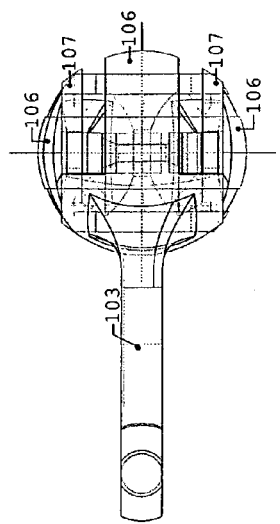
FIG. 12 is a rear view of a pair of the units as shown in FIG. 9.

FIG. 12 is a rear view of a pair of the units as shown in FIG. 9.

We now discuss the embodiment of FIGS. 9-12. It can be seen that the linked and interlocked state includes a pair of units where the second unit is rotated and the arms 103 are locked into the interlocking latch 105 of the hub 106 of the first unit. The second unit has rotated from FIG. 5 towards the interlocking latch 105 and has been interlocked at 90 degrees. It can be seen that the dimension of the interlocking latch 105 of the first unit is just wide enough to receive the width of the arms 103 of the second unit to hold it into place.

Figure 13:
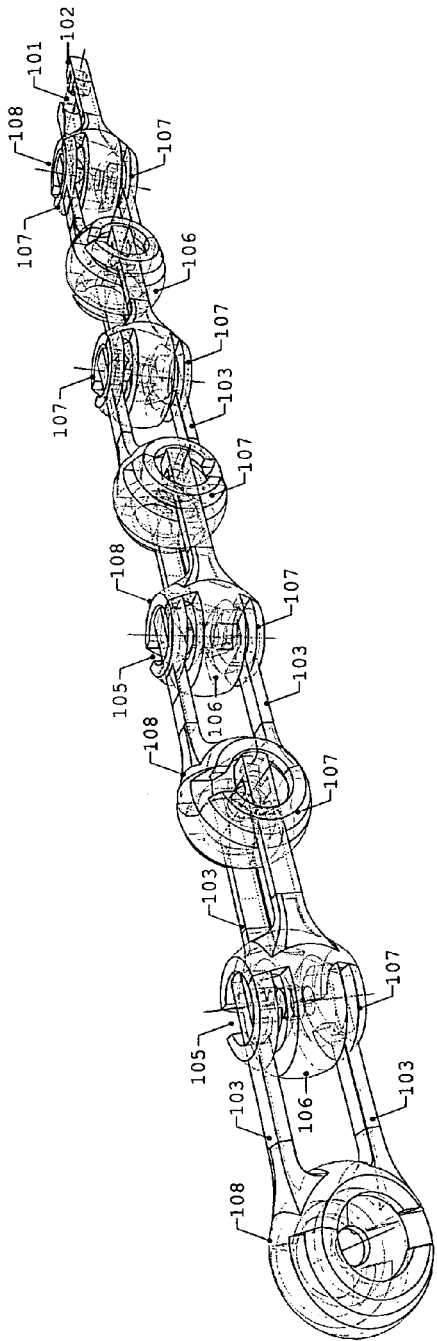
FIG. 13 is a perspective view of a chain of eight units of FIG. 1, shown here linked together, but not interlocked.

FIG. 13 is a perspective view of a chain of eight units of FIG. 1, shown here linked together, but not interlocked. It can be seen here that a chain of units is linked together with compressed arms 103 underneath the flexure arms 107 of the previous units. The alternating rotated pattern of the units specifies the folding direction (left, right, up, down) whereas the interlocking latch 105 angle specifies the angle to witch they will interlock. Both the angle and the orientation dictate, in part, the 3-dimensional shape.

Figure 14:
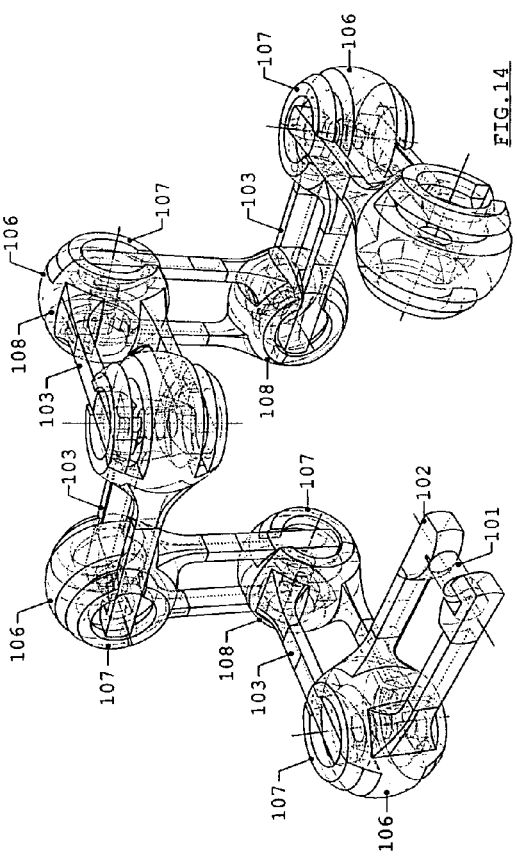
FIG. 14 is a perspective view of a chain of eight units of FIG. 1, shown here linked together and all units interlocked at 90 degrees, forming one possible shape determined in party by the preselected angles.

FIG. 14 is a perspective view of a chain of eight units of FIG. 1, shown here linked together, and all units interlocked at 90 degrees, forming one possible shape determined in party by the preselected angles.

Figure 15:
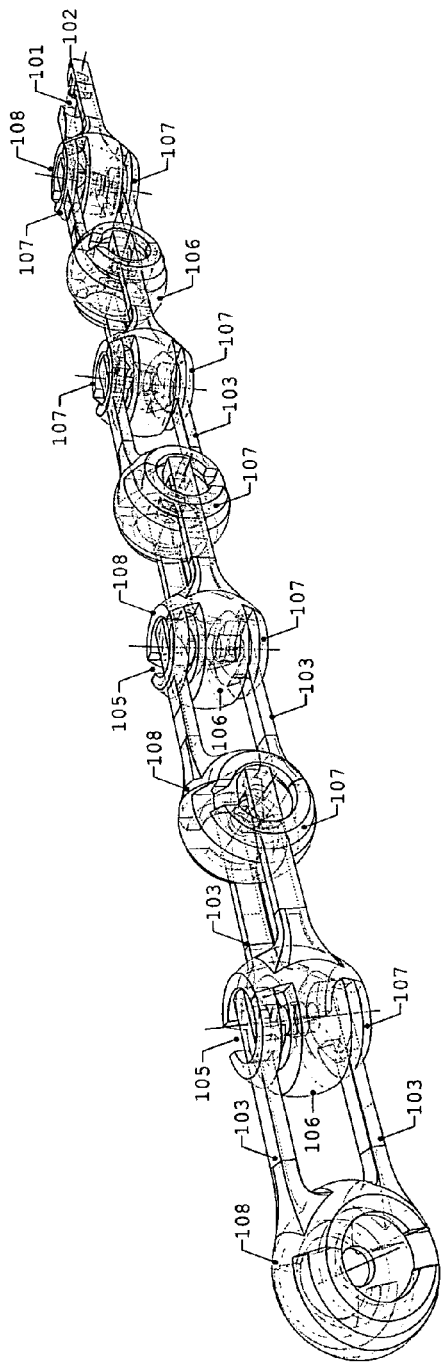
FIG. 15 is a perspective view of a chain of eight units of FIG. 1, shown here linked together, but not interlocked.

FIG. 15 is a perspective view of a chain of eight units of FIG. 1, shown here linked together, but not interlocked.

Figure 16:
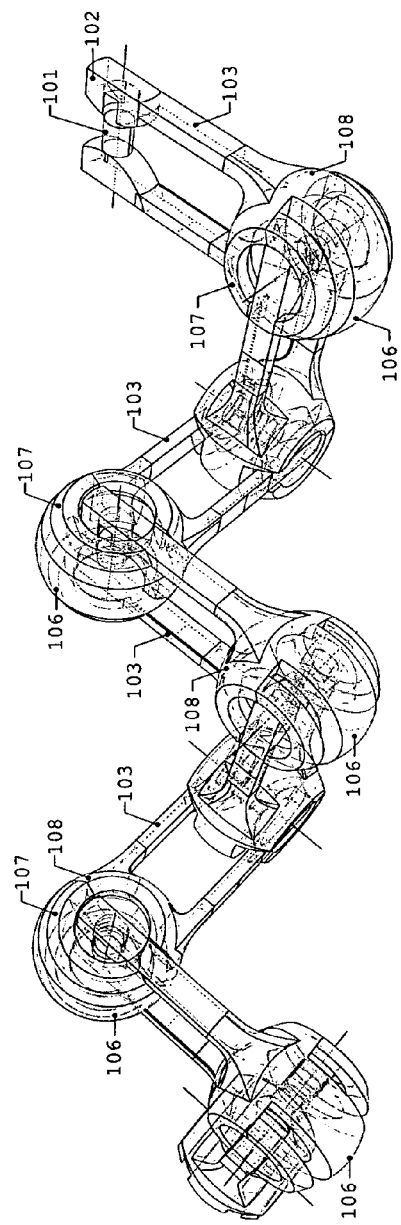
FIG. 16 is a perspective view of a chain of eight units of FIG. 1, shown here linked together and all units interlocked at 90 degrees, forming a second possible shape determined in party by the preselected angles.

FIG. 16 is a perspective view of a chain of eight units of FIG. 1, shown here linked together, and interlocked at 90 degrees, forming a second possible shape determined in party by the preselected angles. It can be seen in this view that the second 3-dimensional shape is significantly different than the shape in FIG. 14, demonstrating the different interlocking latch 105 angles and the selected orientations when they are linked.

We now discuss the embodiment of FIGS. 13-16. When the user has finished linking the desired number of units in the desired orientation for each unit, the chain is ready to be activated ("Linked State"). The user simply picks up the chain from either end (or any part of the chain) and begins to randomly shake it (or add another type of energy). The random shaking provides the direct force on each of the units such that they will each travel in the path of least resistance underneath the flexure arms 107 and will automatically snap into the angle of the interlocking latch 105. Within a few seconds (depending on the length of the chain, complexity of the fold sequence and the amount of energy supplied) all of the units will have interlocked into the correct position and the global 3-dimensional shape will have been assembled. The desired 3-dimensional shape can be any arbitrary 1-dimensional, 2-dimensional or 3-dimensional shape of any arbitrary length and the user can simply shake the initially flexible chain to fully self-assemble the desired shape. Potential shapes may include (although there are limitless possible configurations): a cube, spiral, sphere or other arbitrary polyhedron and arbitrary surfaces etc. The two 3-dimensional configurations shown include a 3-dimensional cantilevered structure (A-04 FIG. 14) and a spiral or zigzag 3-dimensional structure (A-05 FIG. 16).

Figure 17:
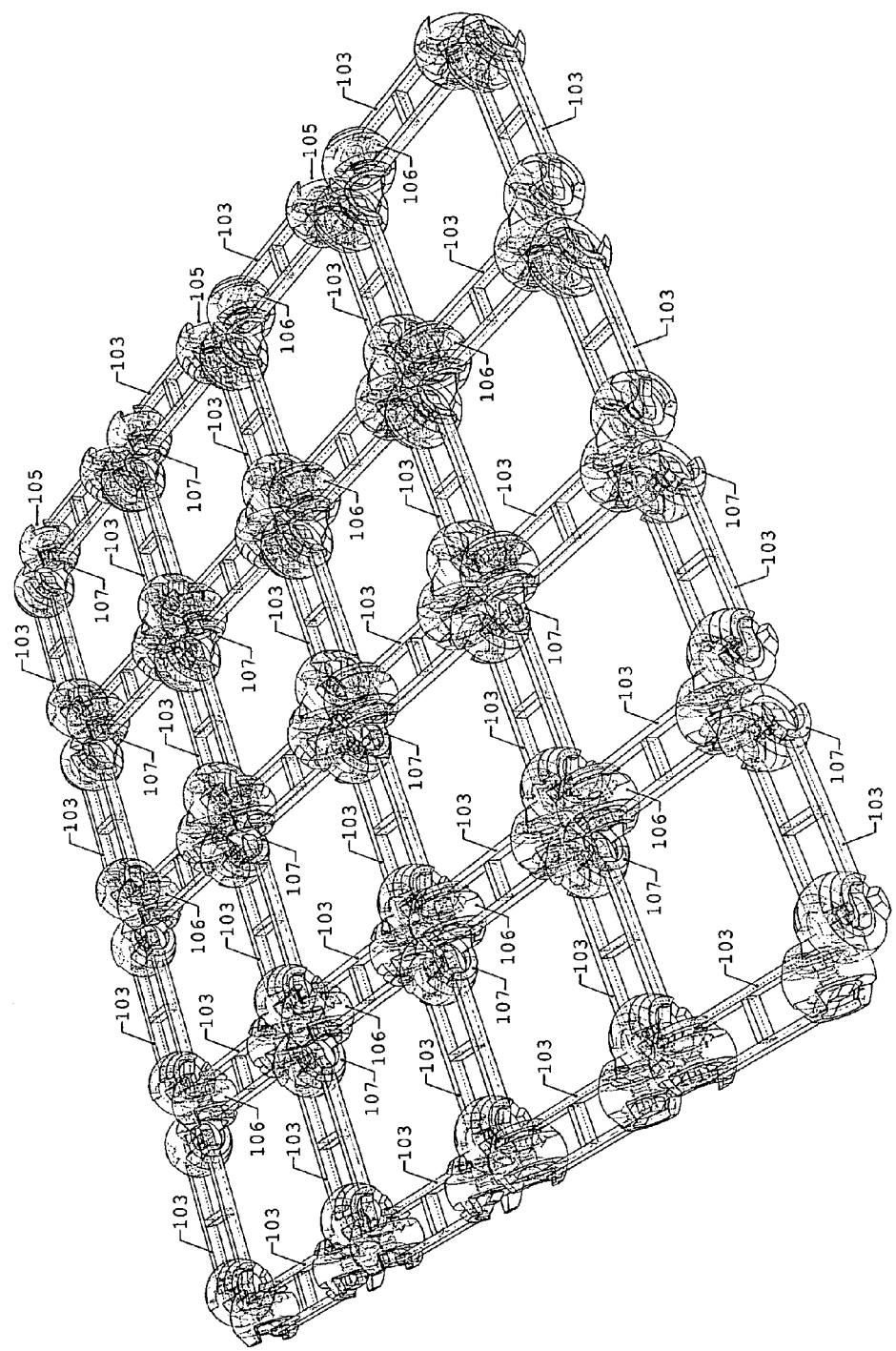
FIG. 17 is a perspective view of a grid of units in accordance with a second embodiment, shown here linked together in a 5×5 configuration but not interlocked.

FIG. 17 is a perspective view of a grid of units in accordance with a second embodiment, shown here linked together in a 5×5 configuration but not interlocked. It can be seen in this view that each of the arms 103 are compressed slightly to fall underneath of the flexure arms 107 and are in a linked and flexible state, ready for activation energy.

Figure 18:
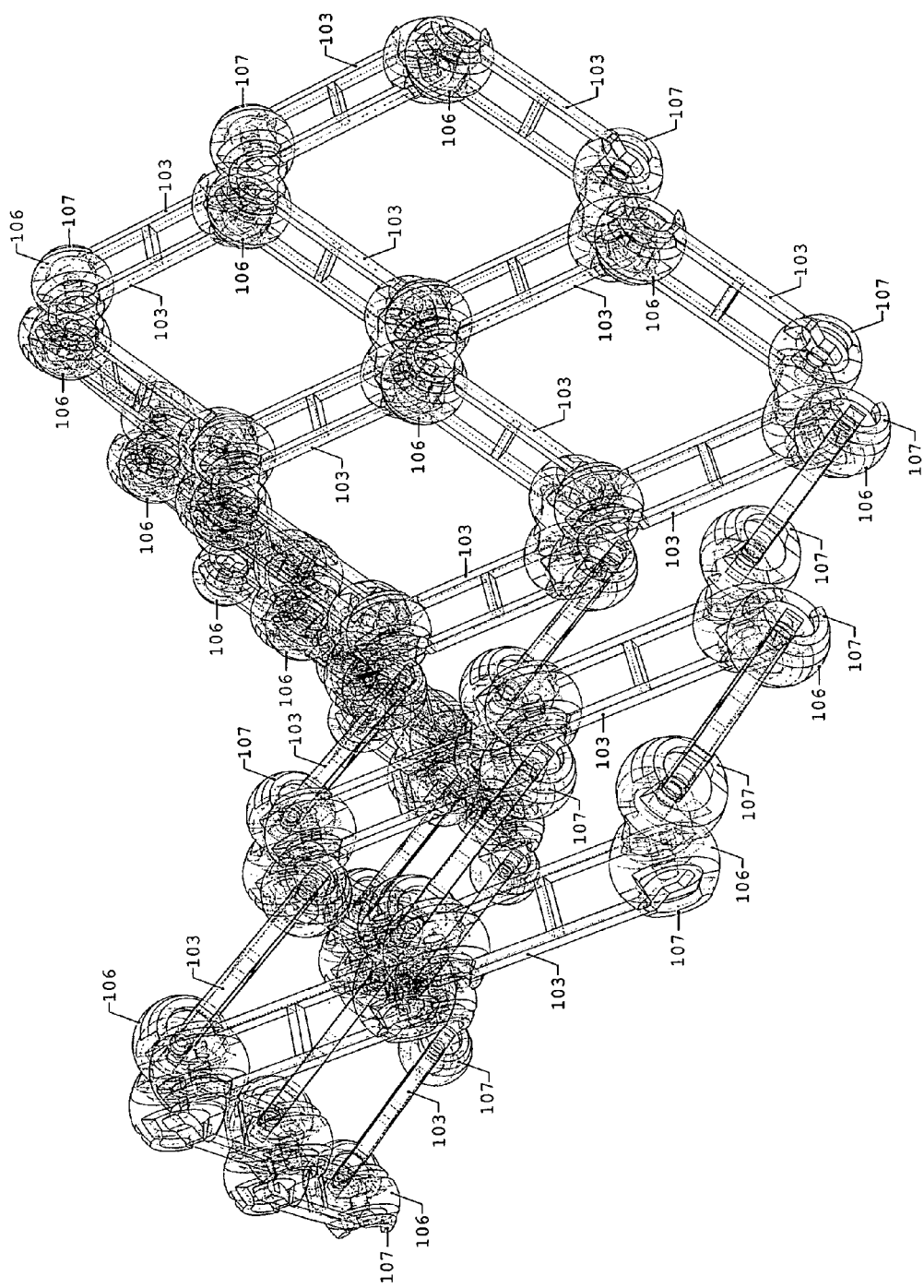
FIG. 18 is a perspective view of a grid of units in accordance with a second embodiment, shown here linked together, and all units interlocked at 45 degrees, forming one possible shape determined in party by the preselected angles.

FIG. 18 is a perspective view of a grid of units in accordance with a second embodiment, shown here linked together, and all units interlocked at 45 degrees, forming one possible shape determined in party by the preselected angles. It can be seen that each of the self-assembly units' arms 103 have locked into the interlocking latch 105 of the neighboring unit. It can also be seen that the combination of the preselected angles and orientation have in part determined the rigid 3-dimensional structure of the final shape.

We now discuss the embodiment of FIGS. 17-18. A secondary embodiment has been shown in the form of a 2-dimensional grid of units. These units contain the same mechanical elements as the previous chain embodiment; however, they now have up to four directions of connection. The initial state of the unit configuration is a flat 2-dimensional grid ("Linked State"); this indicates that the units are ready to be activated. The user simply picks up the grid of units and begins to randomly shake it. The random shaking provides the direct force on each of the units such that they will each travel in the path of least resistance underneath the flexure arms 107 and will automatically snap into the correct interlocking latch 105.

Within a few seconds all of the units will have interlocked into the correct position and the global 3-dimensional structure will have been assembled. The desired global configuration can be any arbitrary 3-dimensional shape that can be made with a 2-dimensional topology (a surface based topology). This desired 3-dimensional shape is described by the series of interlocked angles that are applied to the corresponding unit's interlocking latch 105—this grid of angles will ensure that random shaking correctly assembles the desired 3-dimensional shape. Potential shapes may include (although there are limitless possible configurations): a bowl, saddle, hyperbolic paraboloid, sphere or other arbitrary surface. The 3-dimensional configuration shown is a saddle surface. (We have also demonstrated that the 2-dimensional grid system can be folded into a 3-dimensional structure with alternate forms of energy input, including; random shaking, magnetic and elastics to name a few.)

Figure 19:
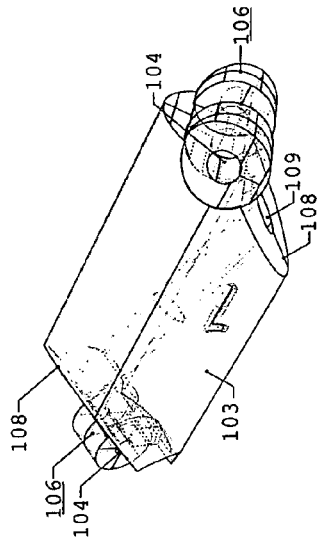
FIG. 19 is a top view of a single self-assembly unit in accordance with a third embodiment.

FIG. 19 is a top view of a single self-assembly unit in accordance with a third embodiment. The unit includes a single assembly arm 103 and pair of hubs 106 at either end of the unit.

Figure 20:
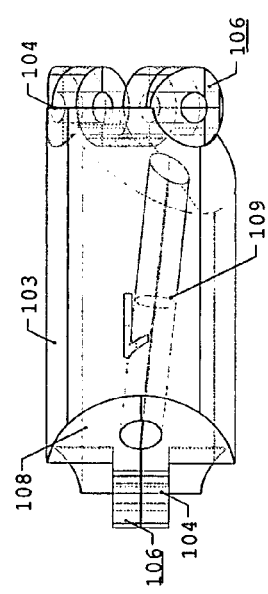
FIG. 20 is a perspective view of a single self-assembly unit in accordance with a third embodiment.

FIG. 20 is a perspective view of a single self-assembly unit in accordance with a third embodiment. In this view it can be seen that the hubs 106 include a pinhole 104 and stopping wall 108. An elastic hole 109 connects the center of the two stopping walls 108 on either end of the unit.

Figure 21:
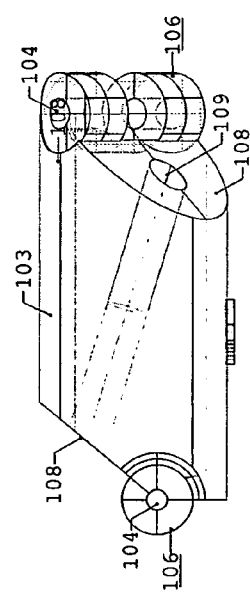
FIG. 21 is a side view of a single self-assembly unit in accordance with a third embodiment.

FIG. 21 is a side view of a single self-assembly unit in accordance with a third embodiment.

Figure 22:
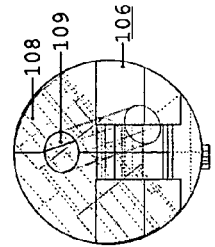
FIG. 22 is a rear view of a single self-assembly unit in accordance with a third embodiment.

FIG. 22 is a rear view of a single self-assembly unit in accordance with a third embodiment.

We now discuss FIGS. 19-22 in specificity. This embodiment is constructed by adding individual units together to form a linked chain. Each unit can be made of plastic, rubber, wood, metal or any other solid or semi-rigid material. In this particular embodiment of the self-assembly system, each unit is unique compared with every other unit in the chain—with two unique angles of stopping walls 108 at the hub 106 at either end of the unit. The stopping walls 108, each have unique angles in accordance to the final global shape of the self-assembly system. The stopping walls 108 will correspond to the stopping wall 108 on the next unit to form the specific folding angle. The unit includes a pair of hubs 106 and a connecting arm 103. The arm 103 is directly connected to the two hubs 106, adding linear length to the unit. An elastic hole 109 connects both stopping walls 108 on either end of the unit, to receive an elastic cord during linking of the chain. One of the hubs 106 can be considered a female shape while the other hub 106 can be considered the male shape and will receive the female shape of the next unit. The pinhole 104 will receive a pin that is inserted during the linking of units to form a chain. The pin will provide rotational movement of unit about the other unit.

Figure 23:
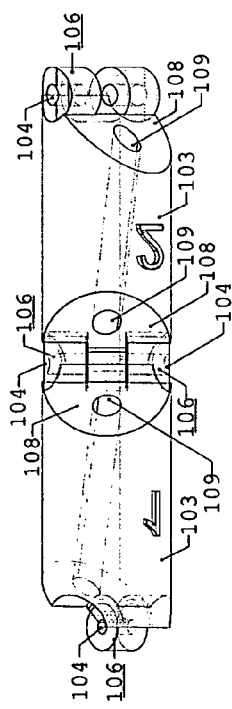
FIG. 23 is a top view of a pair of the units of FIG. 19, shown here linked together, but not interlocked.

FIG. 23 is a top view of a pair of the units of FIG. 19, shown here linked together, but not interlocked. In this view it can be seen that the linked state includes a second unit rotated about the long axis to a specific angle, pertaining to the global 3-dimensional structure of the chain. The female assembly hub 106 of the first unit links with the male assembly hub 106 of the second unit in order to align the pinhole 104 of the first unit with the pinhole 104 of the second unit. In this view the second unit is free to rotate about the axis through the hub 106 at the center of the pinhole 104.

Figure 24:
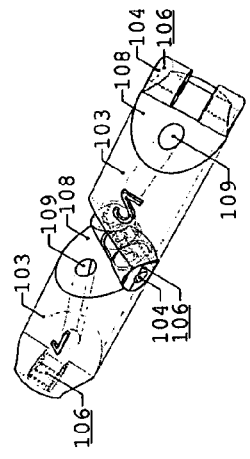
FIG. 24 is a perspective view of a pair of the units of FIG. 19, shown here linked together, but not interlocked.

FIG. 24 is a perspective view of a pair of the units of FIG. 19, shown here linked together, but not interlocked.

Figure 25:
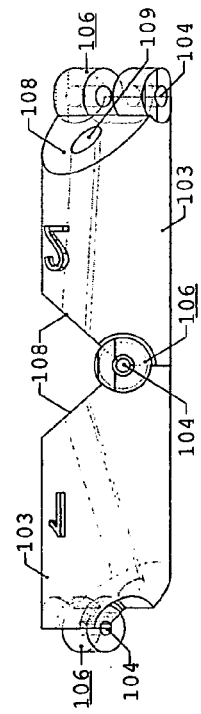
FIG. 25 is a side view of a pair of the units of FIG. 19, shown here linked together, but not interlocked.

FIG. 25 is a side view of a pair of the units of FIG. 19, shown here linked together, but not interlocked. It can be seen that the stopping wall 108 of the first unit and stopping wall 108 of the second unit are facing each other and form an unique angle that allows the second unit to rotate about the pinhole 104 axis and ensure that the two stopping walls 108 meet one another face-to-face.

Figure 26:
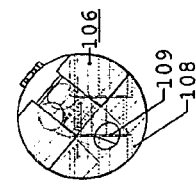
FIG. 26 is a rear view of a pair of the units of FIG. 19, shown here linked together, but not interlocked.

FIG. 26 is a rear view of a pair of the units of FIG. 19, shown here linked together, but not interlocked.

We now discuss the embodiment of FIGS. 23-26. When the user links a unit to the end of the chain, the two unit's unique stopping wall 108 angles will explicitly determine the ultimate rotation of that unit (until the second unit's stopping wall 108 meets the first unit's stopping wall 108). The unique angle of the hub about the long axis and the preselected angle of the stopping walls 108 will determine, in part, the final 3-dimensional shape of the interlocked chain.

Figure 27:
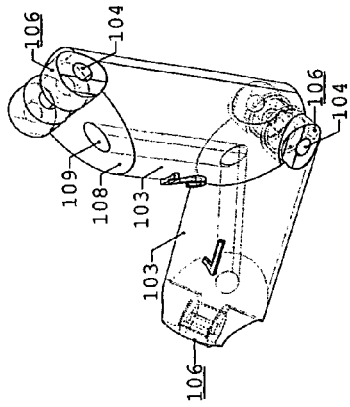
FIG. 27 is a top view of a pair of the units of FIG. 19, shown here linked together and interlocked.

FIG. 27 is a top view of a pair of the units of FIG. 19, shown here linked together and interlocked.

Figure 28:
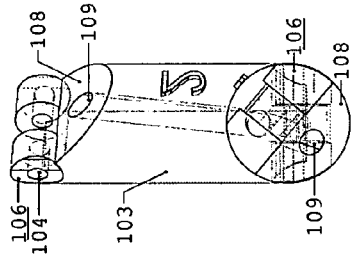
FIG. 28 is a perspective view of a pair of the units of FIG. 19, shown here linked together and interlocked.

FIG. 28 is a perspective view of a pair of the units of FIG. 19, shown here linked together and interlocked. It can be seen in this view that the second unit has rotated about the hub 106 at the center point of the pinhole 104 and that the stopping wall 108 of the second unit has met the stopping wall 108 of the first unit, face-to-face, completing the unique angle for this pair of units.

Figure 29:
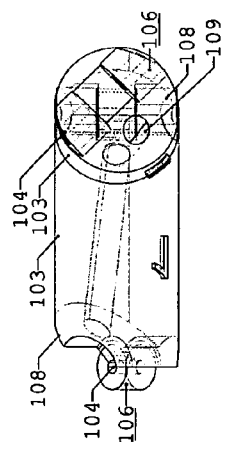
FIG. 29 is a side view of a pair of the units of FIG. 19, shown here linked together and interlocked.

FIG. 29 is a side view of a pair of the units of FIG. 19, shown here linked together and interlocked.

Figure 30:
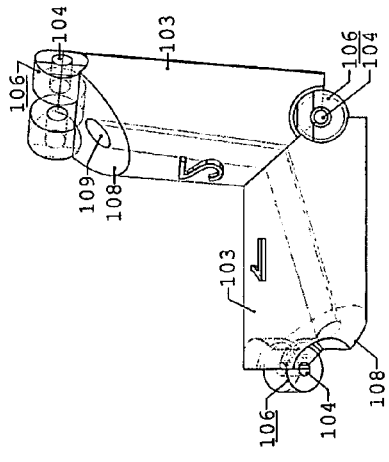
FIG. 30 is a rear view of a pair of the units of FIG. 19, shown here linked together and interlocked.

FIG. 30 is a rear view of a pair of the units of FIG. 19, shown here linked together and interlocked.

We now discuss FIGS. 27-30 in specificity. It can be seen that the linked and interlocked state includes a pair of units where the second unit is rotated such that the stopping walls 108 of both units meet one another. The rotation, in this particular embodiment, is due to the compression force of an elastic cord that has been threaded through the linked units, through the elastic hole 109 shown connecting the two stopping wall 108 faces of each unit.

Figure 31:
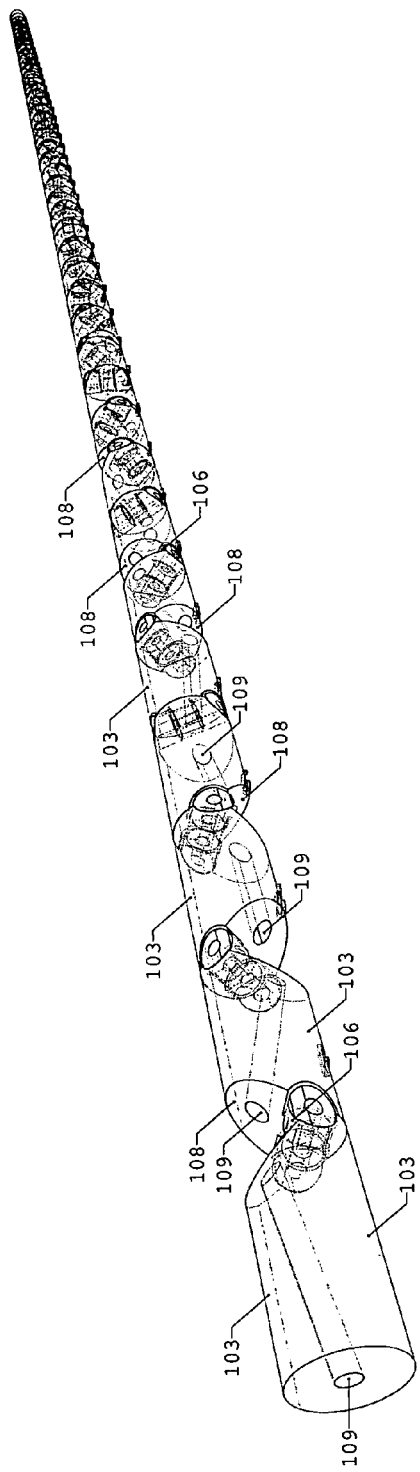
FIG. 31 is a perspective view of a chain of forty five units of FIG. 19, shown here linked together, but not interlocked.

FIG. 31 is a perspective view of a chain of forty-five units of FIG. 19, shown here linked together, but not interlocked.

Figure 32:
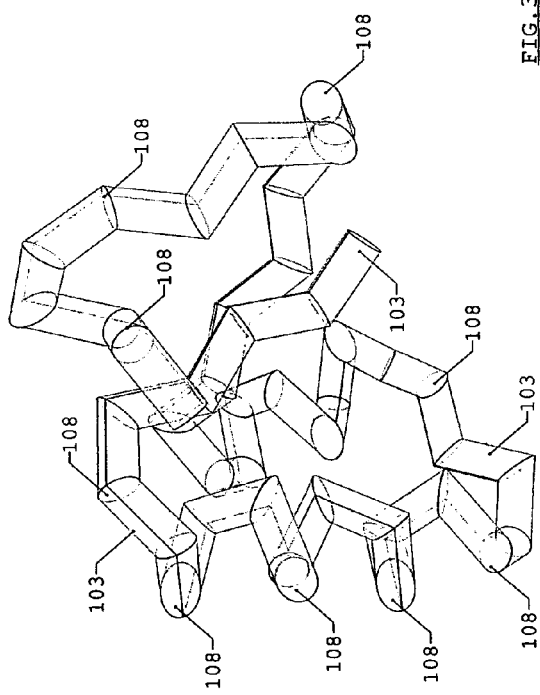
FIG. 32 is a perspective view of a chain of forty five units of FIG. 19, shown here linked together and all units interlocked at custom angles, forming one possible shape, the modeling of the Crambin Protein strand, determined in part by the preselected angles that make up the Crambin Protein.

FIG. 32 is a perspective view of a chain of forty-five units of FIG. 19, shown here linked together and all units interlocked at custom angles, forming one possible shape, the modeling of the Crambin Protein strand, determined in party by the preselected angles that make up the Crambin Protein.

We now discuss FIGS. 31-32 in specificity. When the user has finished linking the desired number of units, the chain is ready to be activated ("Linked State"). The user threads through the elastic holes 109 of each unit an elastic cord of the appropriate compression force and diameter. Then the elastic cord is pulled tight and the user ties the ends of the cord at the ends of the linked chain. The user simply picks up the chain from both ends and stretches it out completely straight and releases it, or throws the unit into the air (or any other technique for releasing the compression force onto the chain). The elastic cord provides a compressive force upon each unit such that the units rotate about the hub 106 at the center point of the pinhole 104 ensuring that the stopping walls 108 have been rotated to meet one other at the specified angle. Within a few seconds (depending on the length of the chain, complexity of the fold sequence and the amount of compressive force supplied in the elastic cord) all of the units will have interlocked into the correct position and the global 3-dimensional shape will have been assembled. The desired 3-dimensional shape can be any arbitrary 1-dimensional, 2-dimensional or 3-dimensional shape of any arbitrary length. In this particular embodiment, the chain is shown to have forty-five units linked together and when self-assembled the interlocked 3-dimensional structure, modeling the 3-dimensional structure of the Crambin Protein strand.

Figure 33:
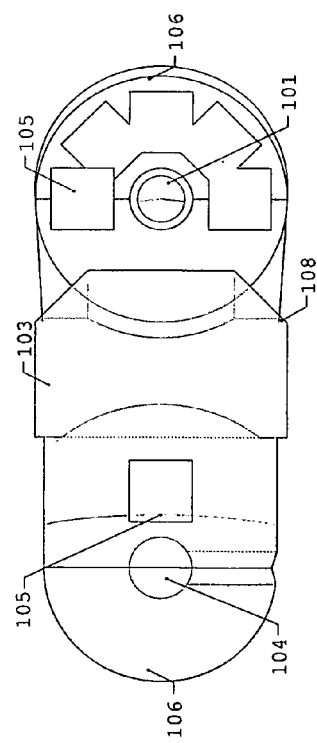
FIG. 33 is a top view of a single self-assembly unit in accordance with a fourth embodiment.

FIG. 33 is a top view of a single self-assembly unit in accordance with a fourth embodiment. The unit includes a single assembly arm 103 and pair of hubs 106 at either end of the unit.

Figure 34:
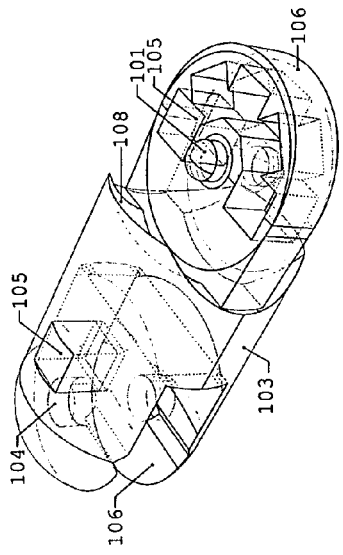
FIG. 34 is a perspective view of a single self-assembly unit in accordance with a fourth embodiment.

FIG. 34 is a perspective view of a single self-assembly unit in accordance with a fourth embodiment. In this view it can be seen that the male hub includes a pin 101, a magnet 105 at a pre-selected angle and a stopping wall 108. The female hub includes two pinholes 104 and a stopping wall. It can also be seen that there is a magnet 105 positioned at the top of the arm 103 in between the two hubs 106.

Figure 35:
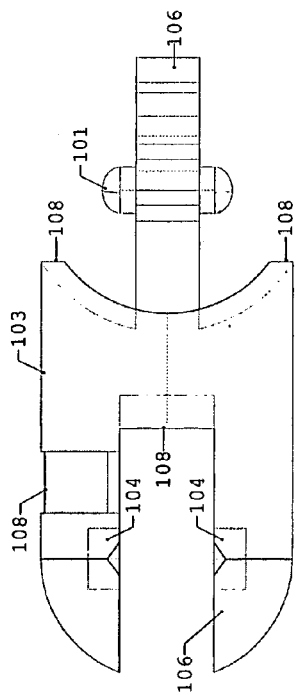
FIG. 35 is a side view of a single self-assembly unit in accordance with a fourth embodiment.

FIG. 35 is a side view of a single self-assembly unit in accordance with a fourth embodiment.

Figure 36:
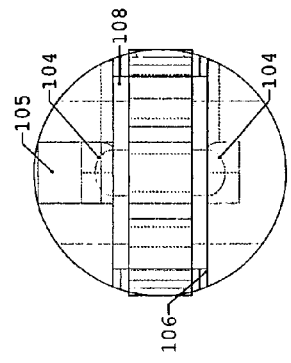
FIG. 36 is a rear view of a single self-assembly unit in accordance with a fourth embodiment.

FIG. 36 is a rear view of a single self-assembly unit in accordance with a fourth embodiment.

We now discuss FIGS. 33-36 in specificity. This embodiment is constructed by adding individual, self-similar, units together to form a linked chain. Each unit can be made of plastic, rubber, wood, metal or any other solid or semi-rigid material. In this particular embodiment of the self-assembly system, each unit is self-similar but becomes unique when a magnet 105 is placed into one of the possible angles of the magnet holes 105 in the hub. The unit includes a pair of hubs 106 and a connecting arm 103. The arm 103 is directly connected to the two hubs 106, adding linear length to the unit. One of the hubs 106 can be considered a female shape while the other hub 106 can be considered the male shape and will receive the female shape of the next unit when linked. The pinholes 104 of a first unit will receive the pin 101 of a next unit when linked. The pin 101 will provide rotational movement of unit about the other unit.

Figure 37:
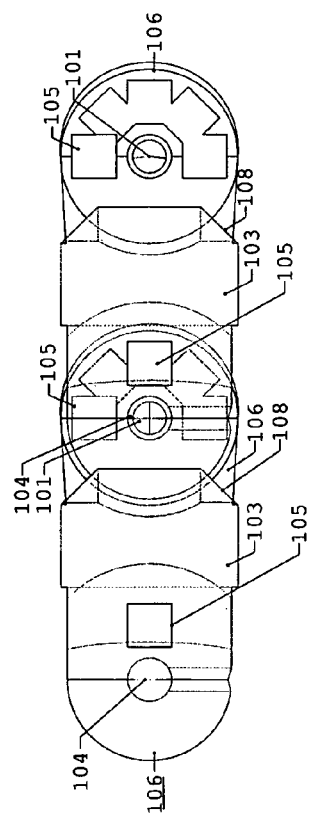
FIG. 37 is a top view of a pair of the units of FIG. 33, shown here linked together, but not interlocked.

FIG. 37 is a top view of a pair of the units of FIG. 33, shown here linked together, but not interlocked. In this view it can be seen that the linked state includes a second unit that is connected about the female hub 106 to a first unit about the male hub 106. The two hubs 106 can be seen as co-planar to one another and thus the two units, when connected and rotated about the pin 101, will rotate in a 2-dimensional plane. In this view the second unit is free to rotate about the axis through the hub 106 at the center of the pin 101. It can also be seen that the magnet 105 in the male hub 106 of the first unit does not align vertically with the magnet 105 in the arm 103 of the second unit.

Figure 38:
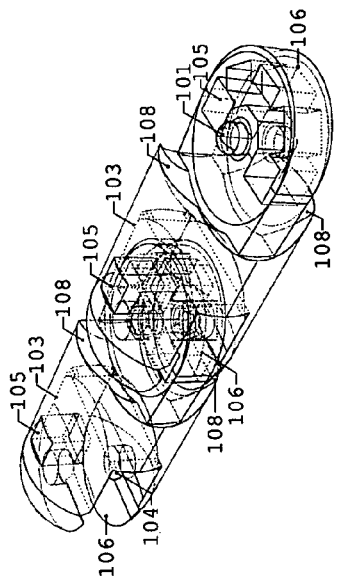
FIG. 38 is a perspective view of a pair of the units of FIG. 33, shown here linked together, but not interlocked.

FIG. 38 is a perspective view of a pair of the units of FIG. 33, shown here linked together, but not interlocked.

Figure 39:
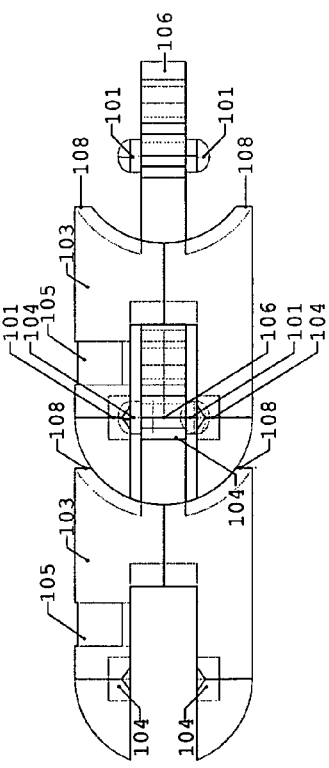
FIG. 39 is a side view of a pair of the units of FIG. 33, shown here linked together, but not interlocked.

FIG. 39 is a side view of a pair of the units of FIG. 33, shown here linked together, but not interlocked.

Figure 40:
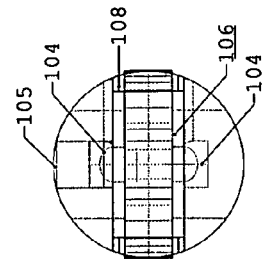
FIG. 40 is a rear view of a pair of the units of FIG. 33, shown here linked together, but not interlocked.

FIG. 40 is a rear view of a pair of the units of FIG. 33, shown here linked together, but not interlocked.

We now discuss the embodiment of FIGS. 37-40. When the user links a unit to the end of the chain, the magnet 105 position in the hub 106 of the first unit will specifically dictate the angle of rotation of the second unit such that the magnet 105 in the arm 103 of the second unit will align. The unique position of the magnet 105 of the first unit will determine, in part, the final 3-dimensional shape of the interlocked chain. The user can also decide the orientation of the second unit to be aligned so that the magnet 105 in the arm 103 of the second unit is facing upwards or is facing downwards, 180 degrees along the long axis of the arm 103. This will in effect flip the fold angle 180 degrees.

Figure 41:
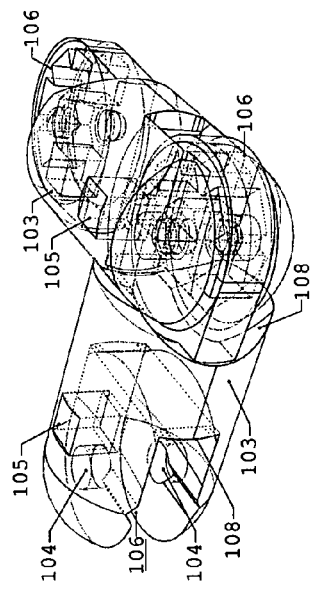
FIG. 41 is a top view of a pair of the units of FIG. 33, shown here linked together and interlocked.

FIG. 41 is a top view of a pair of the units of FIG. 33, shown here linked together and interlocked. It can be seen in this view that the second unit has rotated about the hub 106 at the center point of the pin 101 and that magnet 105 of the first unit and the magnet 105 of the second unit have aligned, completing the rotational angle of the unit pair. It can also be seen that the rotation of the second unit is in place with the first unit because of the co-planar orientation of the two hubs 106 of both units.

Figure 42:
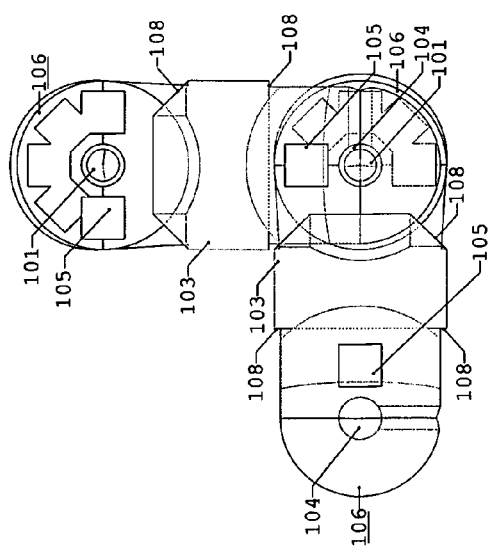
FIG. 42 is a perspective view of a pair of the units of FIG. 33, shown here linked together and interlocked.

FIG. 42 is a perspective view of a pair of the units of FIG. 33, shown here linked together and interlocked.

Figure 43:
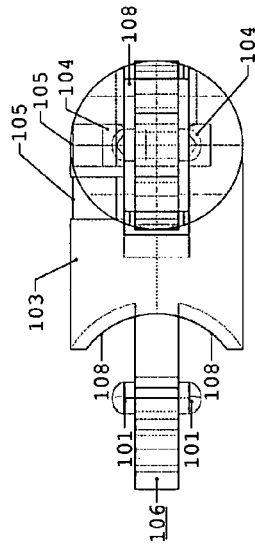
FIG. 43 is a side view of a pair of the units of FIG. 33, shown here linked together and interlocked.

FIG. 43 is a side view of a pair of the units of FIG. 33, shown here linked together and interlocked.

Figure 44:
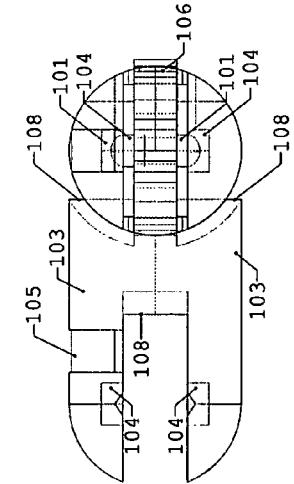
FIG. 44 is a rear view of a pair of the units of FIG. 33, shown here linked together and interlocked.

FIG. 44 is a rear view of a pair of the units of FIG. 33, shown here linked together and interlocked.

We now discuss FIGS. 41-44 in specificity. It can be seen that the linked and interlocked state includes a pair of units where the second unit is rotated such that the magnet 105 of the first unit and the magnet 105 of the second unit align with each other vertically. The rotation, in this particular embodiment, is due to magnetic force of attraction between the two magnets 105 and causes the second unit to rotate about the pin 101 of the first unit. The rotated angle can be changed in each unit by moving the magnet 105 into a different position in the hub 106. Each unit can be configured to have a unique fold angle (magnet 105 position) or can have the same magnet 105 position and fold angle.

Figure 45:
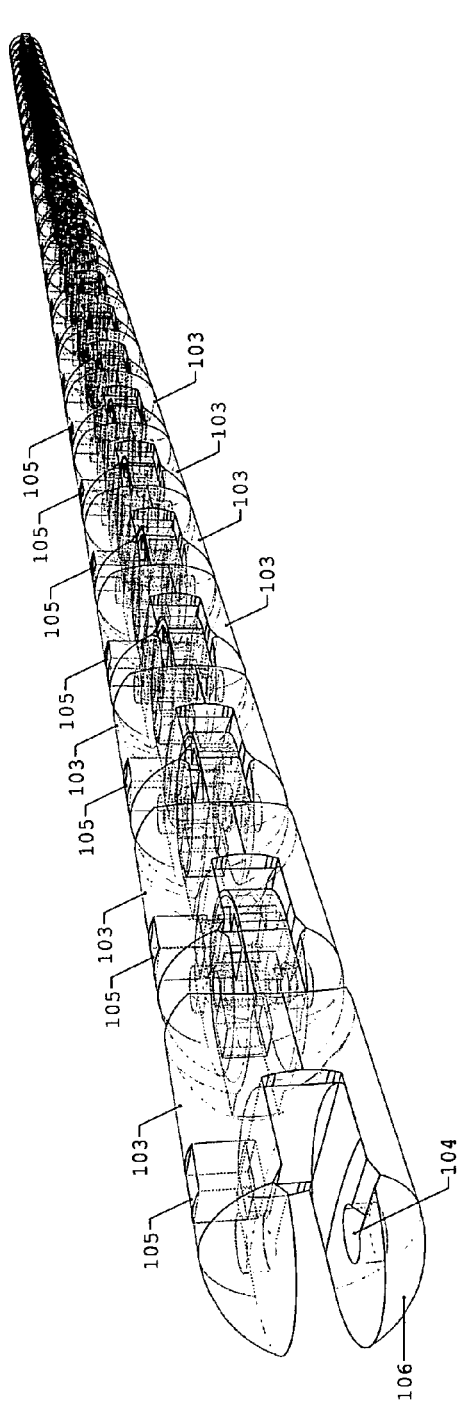
FIG. 45 is a perspective view of a chain of twenty nine units of FIG. 33, shown here linked together, but not interlocked.

FIG. 45 is a perspective view of a chain of twenty-nine units of FIG. 33, shown here linked together, but not interlocked.

Figure 46:
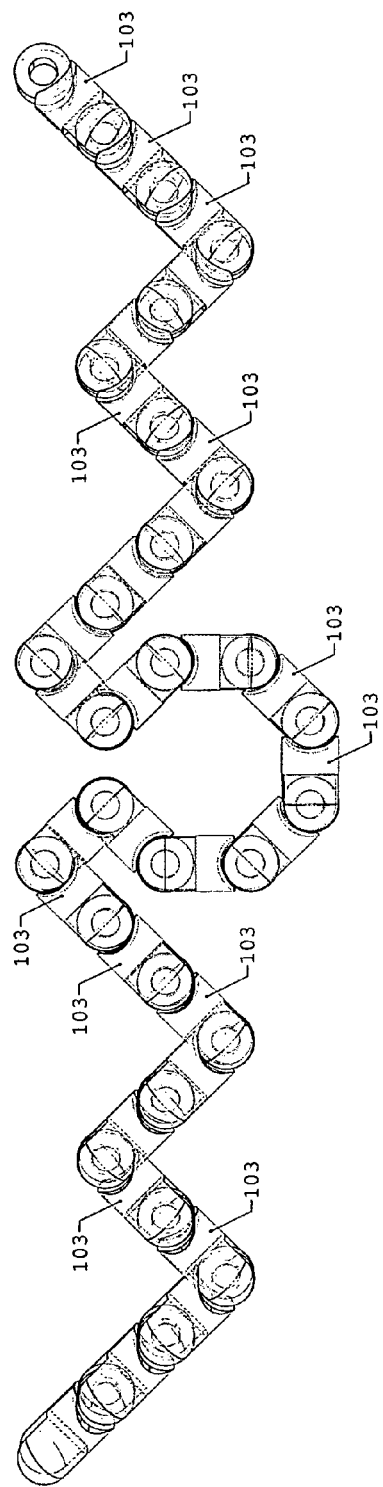
FIG. 46 is a perspective view of a chain of twenty nine units of FIG. 33, shown here linked together and all units interlocked at custom angles, forming one possible 2-dimensional shape, determined in party by the preselected angles that make up the letters "WOW"

FIG. 46 is a perspective view of a chain of twenty-nine units of FIG. 33, shown here linked together and all units interlocked at custom angles, forming one possible shape, the letters "WOW" configured in a 2-dimensional plane.

We now discuss the embodiment of FIGS. 45-46. When the user has finished linking the desired number of units, the chain is ready to be activated ("Linked State"). The linked state must also include two magnets 105 positioned in each of the units. The user must place a magnet 105 into the desired position of the hub 106 and a magnet 105 in the arm 103 of each unit. Then assemble the linked units into a chain. The user simply picks up the chain from both ends and stretches it out completely straight and releases it. The magnetic force of attraction from each magnet 105 in the hub 106 and the corresponding magnet 105 in the arm 103 of the next unit provide a rotational force to fold each unit into the desired angle. Within a few seconds (depending on the length of the chain, complexity of the fold sequence and the amount of magnetic force supplied) all of the units will have interlocked into the correct position and the global 2-dimensional or 3-dimensional shape will have been assembled. The desired shape can be any arbitrary 1-dimensional, 2-dimensional or 3-dimensional shape of any arbitrary length. In this particular embodiment, the chain is shown to spell the letters "WOW" with twenty-nine units configured in a 2-dimensional plane.

Figure 47:
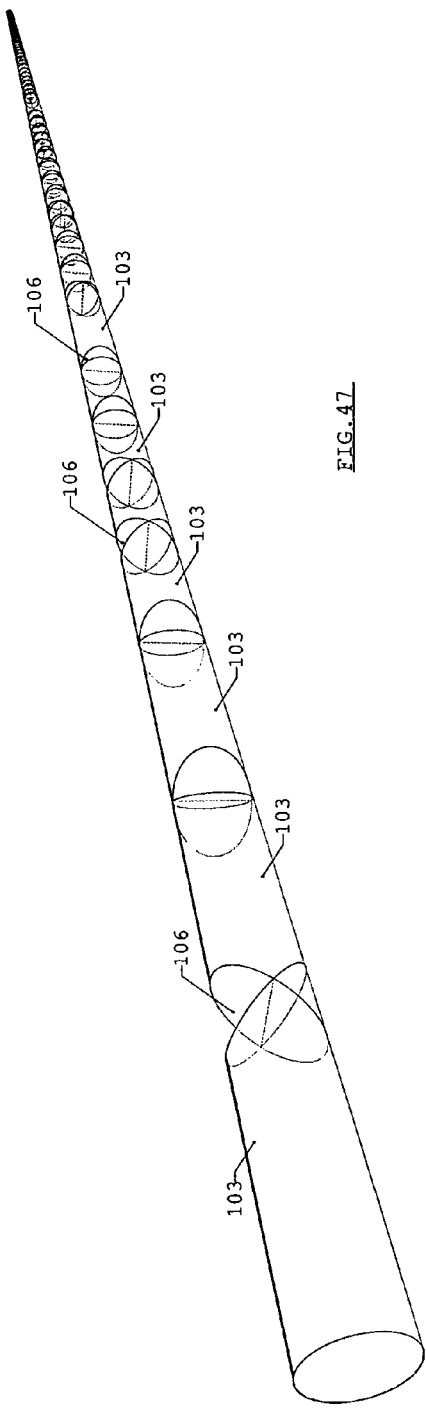
FIG. 47 is a perspective view of a chain of pre-linked units manufactured as a single chain, including assembly arms and hubs, shown here not interlocked.

FIG. 47 is a perspective view of a chain of pre-linked units manufactured as a single chain, including assembly arms and hubs, shown here not interlocked. It can be seen in this view that there is a series of assembly arms 103 connected to a series of hubs 106 manufactured directly into the chain. The hub 106 in this specific embodiment is a chamfered area that forms a fold angle for the chain when energy is supplied.

Figure 48:
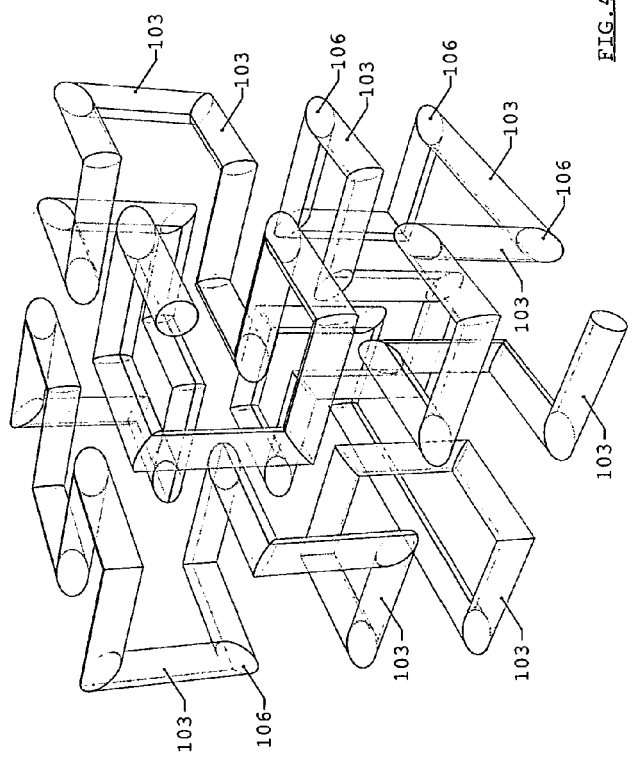
FIG. 48 is a perspective view of a chain of pre-linked units of FIG. 47, shown here interlocked at custom angles, forming one possible 3-dimensional shape, determined in party by the preselected angles that make up complex cube shape.

FIG. 48 is a perspective view of a chain of pre-linked units of FIG. 47, shown here interlocked at custom angles, forming one possible 3-dimensional shape, determined in party by the preselected angles that make up complex cube shape.

We now discuss the embodiment of FIGS. 47-48. The chain has been manufactured, in this specific embodiment, as a single chain (either printed, cast or any other technique that can produce a 1-dimensional or 2-dimensional pattern) including a series of hubs 106 and arms 103 ("Linked State"). The hubs 106 are made of a specific material that will expand 100% when subject to water. In this specific embodiment, water is applied to the length of the chain by either dipping the chain into water or pouring water onto the chain. When water touches the hubs 106, the material expands and forces the two faces of the hub 106 to come into contact with one another. Within a few seconds (depending on the length of the chain, complexity of the fold sequence and the amount of force of expansion within the chain) all of the units will have interlocked into the correct position and the global 2-dimensional or 3-dimensional shape will have been assembled. The desired shape can be any arbitrary 1-dimensional, 2-dimensional or 3-dimensional shape of any arbitrary length. In this particular embodiment, the chain is shown to form the 3-dimensional structure of a complex cube shape. (Other embodiments have been tested that also were manufactured as a single chain with a material that becomes flexible when heated. If torsion springs or magnets are implemented into the hub and the chain is heated, the chain will fold into the desired 2-dimensional or 3-dimensional shape. When the heat is removed the material will harden and the global shape will remain. Many other embodiments of a 1-dimensional or 2-dimensional system with a single manufactured piece of material that responds to a supplied energy source, can be implemented that will self-assembly into an arbitrary 2-dimensional or 3-dimensional shape).

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A set of self-assembly units, wherein each unit comprises:
    a connector hub having a connector hub axis; and
    an assembly arm coupled to the hub and defining an assembly arm plane in which lies a longitudinal axis of the assembly arm;
    the assembly arm including a pair of opposed cantilevered extensions;
    the connector hub having a pair of flexure rings flanking opposite sides of a hub region, so as to define a pair of slots, each slot disposed between each flexure ring and a side of the hub region, and wherein the opposed extensions of the assembly arm of the unit are configured to rotate within the pair of slots in the connector hub of another one of the self-assembly units;
    the opposed extensions of the assembly arm being resiliently flexed towards each other to fit into the slots and thus the opposed extensions and flexure rings being biased to press against each other;
    each of the flexure rings having a recess at a common angular position relative to the hub region, each recess of each self-assembly unit shaped to receive a corresponding opposed extension of another one of the self-assembly units;
    wherein the connector hub and the assembly arm are configured so that (i) when the assembly arm of a first unit of the set is linked with the connector hub of a second unit of the set, a resulting linkage allows motion of the assembly arm of the first unit about the connector hub axis of the second unit and (ii) when the assembly arm is moved into a selected angle about the connector hub axis of the second unit that is defined by the common angular position of the recesses, the assembly arm will interlock at the selected angle, when the opposed extensions are received by the recesses and thus snap into place due to the arms being resiliently unflexed, the selected angle being selected from a set of defined angles;
    so that, when the set of units are linked into a chain without interlocking and thereafter subjected to a suitable energy input, the set of units will interlock with one another so as to assume a shape determined at least in part by the set of defined angles.

2. The set of self-assembly units of claim 1, wherein each unit is separately manufactured and the units are configured to be linked after manufacturing of the units.

3. The set of self-assembly units of claim 1, wherein the set of defined angles includes only a single angle and therefore each unit of the set interlocks with any other unit of the set at the single angle.

4. The set of self-assembly units of claim 3, wherein the connector hub and assembly arm are configured so that the assembly arm of the first unit will interlock at the selected angle with the connector hub of the second unit in either a first orientation of the assembly arm of the first unit or a second orientation wherein the assembly arm of the first unit has been rotated about the longitudinal axis 180 degrees compared to the first orientation.

5. The set of self-assembly units of claim 1, wherein the connector hub and assembly arm are configured so that the assembly arm of the first unit will interlock at the selected angle with the connector hub of the second unit in either a first orientation of the assembly arm of the first unit or a second orientation wherein the assembly arm of the first unit has been rotated about the longitudinal axis 180 degrees compared to the first orientation.

6. The set of self-assembly units of claim 1, wherein the set includes at least two self-assembly units wherein the connector hub axis is not co-planar with the assembly arm plane, so that when the set of units are linked and interlocked, they define a 3-dimensional shape, such shape defined in part by the set of angles, in self-assembly units of the set, between the connector hub axis and the assembly arm plane.

7. The set of self-assembly units of claim 6, wherein the set includes at least two self-assembly units wherein the connector hub axis is perpendicular to the assembly arm plane, so that when the set of units are linked and interlocked, they define a 3-dimensional shape.

8. The set of self-assembly units of claim 1, wherein the set of defined angles includes as many angles as there are units in the set and wherein each unit of the set interlocks with any other unit in the set at an angle that is distinct among the set of units.

9. The set of self-assembly units of claim 1, wherein the set of defined angles includes a smaller number of angles than there are units in the set, so that some angles are repeated when the set of units are interlocked with one another.

* * * * *